(12) United States Patent
Karasawa

(10) Patent No.: US 6,713,777 B2
(45) Date of Patent: Mar. 30, 2004

(54) RADIATION IMAGE READ-OUT METHOD AND APPARATUS

(75) Inventor: Hiroyuki Karasawa, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 215 days.

(21) Appl. No.: 09/942,043

(22) Filed: Aug. 30, 2001

(65) Prior Publication Data

US 2002/0036277 A1 Mar. 28, 2002

(30) Foreign Application Priority Data

Aug. 31, 2000 (JP) .................................... 2000-262856

(51) Int. Cl.⁷ ............................................. G03B 42/08
(52) U.S. Cl. ...................................................... 250/586
(58) Field of Search ............................. 250/586, 484.4

(56) References Cited

U.S. PATENT DOCUMENTS

| 4,571,496 A | * | 2/1986 | Arakawa et al. | 250/484.4 |
| 4,767,927 A | * | 8/1988 | Ohyama et al. | 250/586 |
| 4,816,679 A | | 3/1989 | Sunagawa et al. | 250/327.2 |
| 4,922,103 A | | 5/1990 | Kawajiri et al. | 250/327.2 |
| 5,455,428 A | * | 10/1995 | Miyagawa | 250/586 |
| 5,540,859 A | * | 7/1996 | Nakamura et al. | 250/484.4 |
| 5,814,831 A | * | 9/1998 | Verbeke | 250/586 |

FOREIGN PATENT DOCUMENTS

| EP | 1 113 292 A2 | 7/2001 | G01T/1/29 |
| JP | 60-111568 A | 6/1985 | H04N/1/04 |
| JP | 60-236354 A | 11/1985 | H04N/1/04 |
| JP | 1-101540 A | 4/1989 | G03B/42/02 |

OTHER PUBLICATIONS

Abstract 01–101540, Apr. 19, 1989.

* cited by examiner

Primary Examiner—Constantine Hannaher
(74) Attorney, Agent, or Firm—Sughrue Mion, PLLC

(57) ABSTRACT

Stimulating rays are linearly irradiated onto an area of a surface of a stimulable phosphor sheet, light emitted by the sheet is collected with a light collecting optical system, and the collected light is detected with a line sensor. An end face of an optical device constituting the light collecting optical system, which end face stands facing the sheet, is formed into a shape such that the stimulating rays, which have been reflected from the surface of the sheet, are reflected by the end face toward the linear area of the sheet exposed to the linear stimulating rays or toward a region of the sheet, which region is located more forward, with respect to a sub-scanning direction, than the linear area of the sheet exposed to the linear stimulating rays.

15 Claims, 4 Drawing Sheets

RADIATION IMAGE READ-OUT METHOD AND APPARATUS

BACKGROUND OF THE INVENTION

1. Field of the Invention

This invention relates to a radiation image read-out method and apparatus, wherein stimulating rays are irradiated to a stimulable phosphor sheet, on which a radiation image has been stored, and light, which is emitted by the stimulable phosphor sheet when the stimulable phosphor sheet is exposed to the stimulating rays, is photoelectrically detected, an image signal representing the radiation image being thereby obtained. This invention particularly relates to a radiation image read-out method and apparatus, wherein the stimulating rays are linearly irradiated to the stimulable phosphor sheet, and the light emitted by the stimulable phosphor sheet is detected with a line sensor.

2. Description of the Related Art

Radiation image recording and reproducing systems, wherein a stimulable phosphor sheet, which comprises a substrate and a layer of a stimulable phosphor overlaid on the substrate, have heretofore been widely used in practice.

With the radiation image recording and reproducing systems, a stimulable phosphor sheet is exposed to radiation carrying image information of an object, such as a human body, and a radiation image of the object is thereby recorded on the stimulable phosphor sheet. Thereafter, stimulating rays, such as a laser beam, are caused to scan the stimulable phosphor sheet in two-dimensional directions. The stimulating rays cause an exposed area of the stimulable phosphor sheet to emit light in proportion to the amount of energy stored thereon during its exposure to the radiation. The light emitted from the exposed area of the stimulable phosphor sheet, upon stimulation thereof, is photoelectrically detected and converted into an electric image signal by photoelectric read-out means.

The image signal, which has been obtained from the radiation image recording and reproducing systems described above, is then subjected to image processing, such as gradation processing and processing in the frequency domain, such that a visible radiation image, which has good image quality and can serve as an effective tool in, particularly, the efficient and accurate diagnosis of an illness, can be obtained. The image signal having been obtained from the image processing is utilized for reproducing a visible image for diagnosis, or the like, on film or displaying a visible image for diagnosis, or the like, on a cathode ray tube (CRT) display device. In cases where the stimulable phosphor sheet, from which the image signal has been detected, is then exposed to erasing light, and energy remaining on the stimulable phosphor sheet is thereby released, the erased stimulable phosphor sheet is capable of being used again for the recording of a radiation image.

Also, a novel radiation image recording and reproducing system aiming at enhancement of a detection quantum efficiency in the formation of the radiation image, i.e., a radiation absorptivity, a light emission efficiency, an emitted light pickup efficiency, and the like, wherein a novel type of stimulable phosphor sheet is utilized, has been proposed in, for example, Japanese Patent Application No. 11(1999)-372978. With the novel type of the stimulable phosphor sheet utilized in the proposed radiation image recording and reproducing system, the radiation absorbing functions and the energy storing functions of the conventional stimulable phosphor sheet are separated from each other.

The novel type of the stimulable phosphor sheet utilized in the proposed radiation image recording and reproducing system contains a layer of a stimulable phosphor for energy storage, which is capable of absorbing light having wavelengths falling within an ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

The novel type of the stimulable phosphor sheet should preferably take on the form combined with a layer of a phosphor for radiation absorption, which is capable of absorbing radiation and being caused to emit light having wavelengths falling within an ultraviolet to visible region. In such cases, energy from the light having wave lengths falling within the ultraviolet to visible region, which light is emitted from the layer of the phosphor for radiation absorption when the layer of the phosphor for radiation absorption is exposed to the radiation carrying image information of an object, (the amount of the energy corresponding to the radiation image information) is stored on the layer of the stimulable phosphor for energy storage. When the stimulable phosphor sheet, on which the radiation image has thus been stored, is scanned with the stimulating rays, the light carrying the radiation image information is emitted from the layer of the stimulable phosphor for energy storage.

The novel type of the stimulable phosphor sheet need not necessarily be provided with the layer of the phosphor for radiation absorption. In such cases, the novel type of the stimulable phosphor sheet is utilized in combination with a fluorescent screen, which is provided with the layer of the phosphor for radiation absorption capable of absorbing radiation and being caused to emit the light having wavelengths falling within the ultraviolet to visible region.

Specifically, in such cases, the fluorescent screen is kept in close contact with the novel type of the stimulable phosphor sheet, and the radiation carrying the image information of the object is irradiated to the fluorescent screen. As a result, the light having wavelengths falling within the ultraviolet to visible region is emitted from the layer of the phosphor for radiation absorption of the fluorescent screen. Also, energy from the light emitted from the phosphor for radiation absorption (the amount of the energy corresponding to the radiation image information) is stored on the layer of the stimulable phosphor for energy storage of the stimulable phosphor sheet. When the stimulable phosphor sheet, on which the radiation image has thus been stored, is scanned with the stimulating rays, the light carrying the radiation image information is emitted from the layer of the stimulable phosphor for energy storage.

Novel radiation image read-out apparatuses for use in the radiation image recording and reproducing systems described above have been proposed in, for example, Japanese Unexamined Patent Publication Nos. 60(1985)-111568, 60(1985)-236354, and 1(1989)-101540. In the proposed radiation image read-out apparatuses, from the point of view of keeping the emitted light detection time short, reducing the size of the apparatus, and keeping the cost low, a line sensor comprising a charge coupled device (CCD) image sensor, or the like, is utilized as the photoelectric read-out means.

Basically, the radiation image read-out apparatuses of such types comprise:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a line sensor, which comprises a plurality of photoelectric conversion devices arrayed along the linear area of the stimulable phosphor sheet exposed to the linear stimulating rays, iii) a light collecting optical system, which is located between the line sensor and the stimulable phosphor sheet, the light collecting optical system collecting the light, which has been emitted from the linear area of the stimulable phosphor sheet exposed to the linear stimulating rays, and guiding the collected light toward the line sensor, and iv) sub-scanning means for moving the stimulable phosphor sheet with respect to the stimulating ray irradiating means, the light collecting optical system, and the line sensor and in a direction (a sub-scanning direction) intersecting with a length direction of the linear area of the stimulable phosphor sheet exposed to the linear stimulating rays (a main scanning direction).

With the conventional radiation image read-out apparatuses described above, it often occurs that the stimulating rays, which have been reflected from a surface of the stimulable phosphor sheet toward the light collecting optical system, are reflected by the light collecting optical system and impinge upon an unread fresh region of the stimulable phosphor sheet, from which unread fresh region the radiation image information has not yet been read out. In such cases, the unread fresh region of the stimulable phosphor sheet is stimulated by the stimulating rays to emit light, and the light emitted from the unread fresh region is detected by the line sensor. As a result, the problems occur in that the image quality of a reproduced radiation image becomes bad due to a fog, or an artifact occurs in the reproduced radiation image.

Also, in cases where the stimulating rays, which have been reflected from the surface of the stimulable phosphor sheet, impinge upon the unread fresh region of the stimulable phosphor sheet and stimulate the unread fresh region, the stimulating rays cannot be utilized correctly for the radiation image readout. Therefore, in such cases, the efficiency, with which the stimulating rays are utilized, cannot be kept high.

SUMMARY OF THE INVENTION

The primary object of the present invention is to provide a radiation image read-out method, in which light emitted from a linear area of a stimulable phosphor sheet exposed to linear stimulating rays is collected by a light collecting optical system and guided toward a line sensor, wherein the stimulating rays having been reflected from a surface of the stimulable phosphor sheet are prevented from impinging upon an unread fresh region of the stimulable phosphor sheet, such that image quality of a reproduced radiation image is prevented from becoming bad, and such that an artifact is prevented from occurring in the reproduced radiation image.

Another object of the present invention is to provide a radiation image read-out method, in which light emitted from a linear area of a stimulable phosphor sheet exposed to linear stimulating rays is collected by a light collecting optical system and guided toward a line sensor, wherein the stimulating rays having been reflected from a surface of the stimulable phosphor sheet are prevented from impinging upon an unread fresh region of the stimulable phosphor sheet, such that an efficiency, with which the stimulating rays are utilized, is kept high.

The specific object of the present invention is to provide an apparatus for carrying out the radiation image read-out method.

The present invention provides a radiation image read-out method, comprising the steps of:

i) linearly irradiating stimulating rays onto an area of a surface of a stimulable phosphor sheet, on which a radiation image has been stored, with stimulating ray irradiating means, the stimulating rays causing the stimulable phosphor sheet to emit light in proportion to an amount of energy stored thereon during its exposure to radiation, ii) collecting the light, which has been emitted from the linear area of the stimulable phosphor sheet exposed to the linear stimulating rays, with a light collecting optical system, iii) receiving the collected light with a line sensor, which comprises a plurality of photoelectric conversion devices arrayed along the linear area of the stimulable phosphor sheet exposed to the linear stimulating rays, the received light being subjected to photoelectric conversion performed by the line sensor, and iv) moving the stimulable phosphor sheet with respect to the stimulating ray irradiating means, the light collecting optical system, and the line sensor and in a sub-scanning direction, which intersects with a length direction of the linear area of the stimulable phosphor sheet exposed to the linear stimulating rays, wherein an end face of an optical device constituting the light collecting optical system, which end face stands facing the stimulable phosphor sheet, is formed into a shape such that the stimulating rays, which have been reflected from the surface of the stimulable phosphor sheet, are reflected by the end face toward the linear area of the stimulable phosphor sheet exposed to the linear stimulating rays or toward a region of the stimulable phosphor sheet, which region is located more forward, with respect to the sub-scanning direction, than the linear area of the stimulable phosphor sheet exposed to the linear stimulating rays.

The present invention also provides a radiation image read-out apparatus, comprising:

i) stimulating ray irradiating means for linearly irradiating stimulating rays onto an area of a surface of a stimulable phosphor sheet, on which a radiation image has been stored, the stimulating rays causing the stimulable phosphor sheet to emit light in proportion to an amount of energy stored thereon during its exposure to radiation, ii) a line sensor, which comprises a plurality of photoelectric conversion devices arrayed along the linear area of the stimulable phosphor sheet exposed to the linear stimulating rays, iii) a light collecting optical system, which is located between the line sensor and the stimulable phosphor sheet, the light collecting optical system collecting the light, which has been emitted from the linear area of the stimulable phosphor sheet exposed to the linear stimulating rays, and guiding the collected light toward the line sensor, and iv) sub-scanning means for moving the stimulable phosphor sheet with respect to the stimulating ray irradiating means, the light collecting optical system, and the line sensor and in a sub-scanning direction, which intersects with a length direction of the linear area of the stimulable phosphor sheet exposed to the linear stimulating rays, wherein an end face of an optical device constituting the light collecting optical system, which end face stands facing the stimulable phosphor sheet, is formed into a shape such that the stimulating rays, which have been reflected from the surface of the stimulable phosphor sheet, are reflected by the end face toward the linear area of the stimulable phosphor sheet exposed to the linear stimulating rays or toward a region of the stimulable phosphor sheet, which region is located more forward, with respect to the sub-scanning direction, than the linear area of the stimulable phosphor sheet exposed to the linear stimulating rays.

In the radiation image read-out method and apparatus in accordance with the present invention, the optical device, whose end face is formed into the shape defined above, should preferably be a gradient index lens array.

Also, in the radiation image read-out method and apparatus in accordance with the present invention, the end face of the optical device, which end face stands facing the stimulable phosphor sheet, should preferably be formed into a shape such that the stimulating rays, which have been regularly reflected from the surface of the stimulable phosphor sheet, are reflected by the end face toward the linear area of the stimulable phosphor sheet exposed to the linear stimulating rays or toward the region of the stimulable phosphor sheet, which region is located more forward, with respect to the sub-scanning direction, than the linear area of the stimulable phosphor sheet exposed to the linear stimulating rays.

Further, in the radiation image read-out method and apparatus in accordance with the present invention, the stimulable phosphor sheet may be a stimulable phosphor sheet having both the functions for radiation absorption and the functions for energy storage. Alternatively, the stimulable phosphor sheet may be a stimulable phosphor sheet provided with a layer of a stimulable phosphor for energy storage.

In cases where the stimulable phosphor sheet is a stimulable phosphor sheet provided with the layer of the stimulable phosphor for energy storage, the stimulable phosphor sheet may also be provided with a layer of a phosphor for radiation absorption. Alternatively, in such cases, the stimulable phosphor sheet may not be provided with the layer of the phosphor for radiation absorption and may be utilized in combination with a fluorescent screen having the layer of the phosphor for radiation absorption.

As will be understood from the specification, it should be noted that the term "moving a stimulable phosphor sheet with respect to stimulating ray irradiating means, a light collecting optical system, and a line sensor" as used herein means movement of the stimulable phosphor sheet relative to the stimulating ray irradiating means, the light collecting optical system, and the line sensor, and embraces the cases wherein the stimulable phosphor sheet is moved while the stimulating ray irradiating means, the light collecting optical system, and the line sensor are kept stationary, the cases wherein the stimulating ray irradiating means, the light collecting optical system, and the line sensor are moved while the stimulable phosphor sheet is kept stationary, and the cases wherein both the stimulable phosphor sheet and the stimulating ray irradiating means, the light collecting optical system, and the line sensor are moved. In cases where the stimulating ray irradiating means, the light collecting optical system, and the line sensor are moved, they should be moved together with one another.

With the radiation image read-out method and apparatus in accordance with the present invention, the end face of the optical device, e.g. the gradient index lens array, constituting the light collecting optical system, which end face stands facing the stimulable phosphor sheet, is formed into the shape such that the stimulating rays, which have been reflected from the surface of the stimulable phosphor sheet, are reflected by the end face toward the linear area of the stimulable phosphor sheet exposed to the linear stimulating rays or toward the region of the stimulable phosphor sheet, which region is located more forward, with respect to the sub-scanning direction, than the linear area of the stimulable phosphor sheet exposed to the linear stimulating rays, (i.e., the region of the stimulable phosphor sheet, from which the radiation image information has already been read out). Therefore, the stimulating rays, which have been reflected from the surface of the stimulable phosphor sheet, do not impinge upon the unread fresh region of the stimulable phosphor sheet. Accordingly, the image quality of the reproduced radiation image is capable of being prevented from becoming bad. Also, an artifact is capable of being prevented from occurring in the reproduced radiation image.

In particular, with the radiation image read-out method and apparatus in accordance with the present invention, wherein the end face of the optical device, which end face stands facing the stimulable phosphor sheet, is formed into the shape such that the stimulating rays, which have been reflected from the surface of the stimulable phosphor sheet, are reflected by the end face toward the linear area of the stimulable phosphor sheet exposed to the linear stimulating rays, the stimulating rays having been reflected from the surface of the stimulable phosphor sheet are capable of being efficiently utilized for stimulating the stimulable phosphor sheet. Therefore, the efficiency, with which the stimulating rays are utilized, is capable of being kept high.

With conventional techniques, wherein a thin beam of the stimulating rays is deflected, the stimulable phosphor sheet is scanned with one light spot in the main scanning direction, and light detection signal components obtained by photoelectrically detecting the light emitted by the stimulable phosphor sheet are sampled in synchronization with the main scanning, if the stimulating rays, which have been reflected from the end face of the optical device, are returned onto the same main scanning line on the stimulable phosphor sheet in the manner described above, the light emitted from sites on the stimulable phosphor sheet other than sampling points will act as a flare.

However, with the radiation image read-out method and apparatus in accordance with the present invention, the stimulating rays are linearly irradiated onto the stimulable phosphor sheet, and all of the light, which is emitted from the linear area of the stimulable phosphor sheet exposed to the linear stimulating rays, is simultaneously detected with the line sensor.

Specifically, all of the radiation image information having been stored along one main scanning line is read out simultaneously. Therefore, in cases where the stimulating rays, which have been reflected from the end face of the optical device, are returned onto the linear area of the stimulable phosphor sheet exposed to the linear stimulating rays, the thus returned stimulating rays are capable of being utilized efficiently for the radiation image readout, and the adverse effects of the flare do not occur.

DESCRIPTION OF THE PREFERRED EMBODIMENTS

The present invention will hereinbelow be described in further detail with reference to the accompanying drawings.

Figure 1:
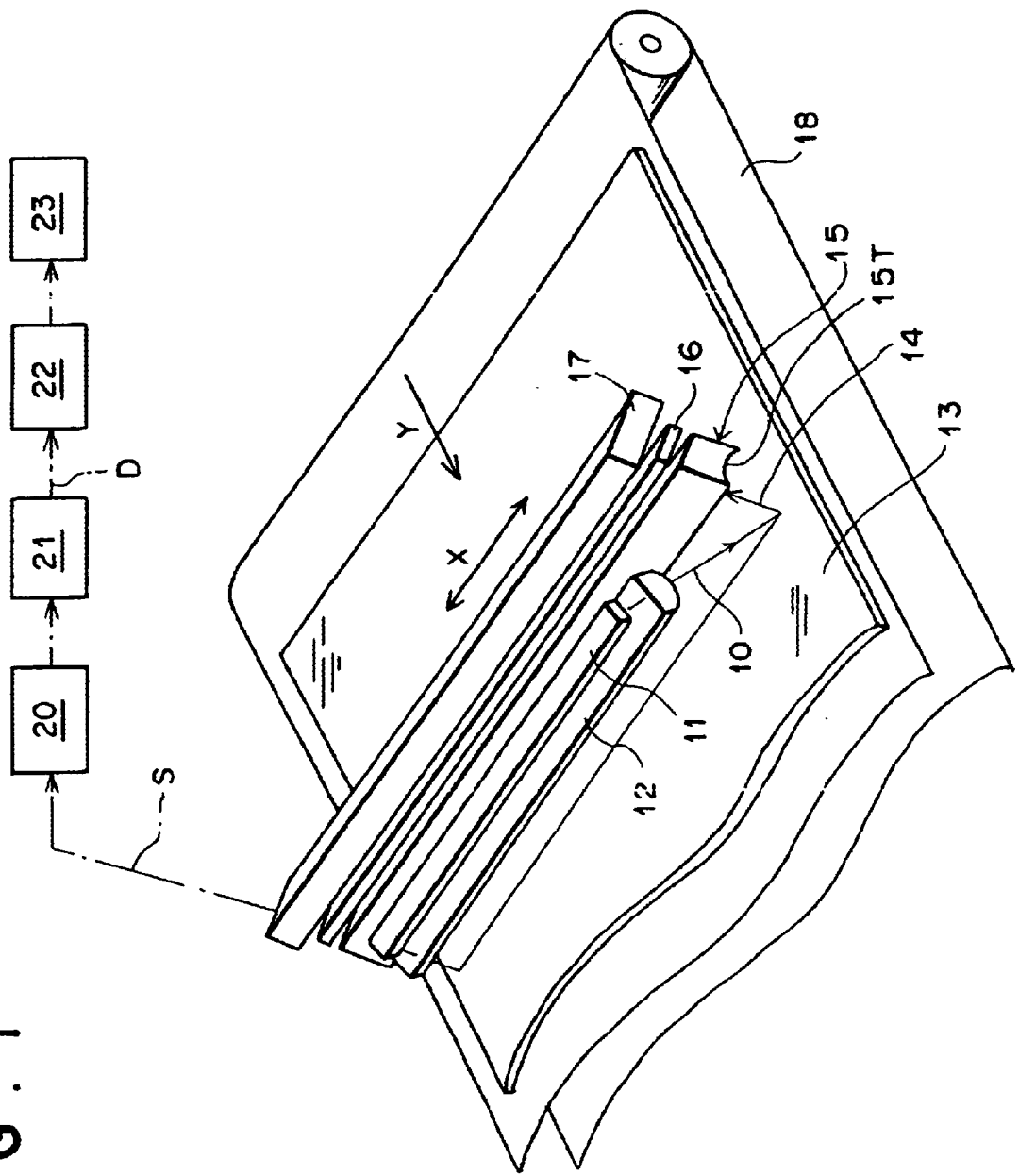
FIG. 1 is a perspective view showing a first embodiment of the radiation image read-out apparatus in accordance with the present invention.
Figure 2:
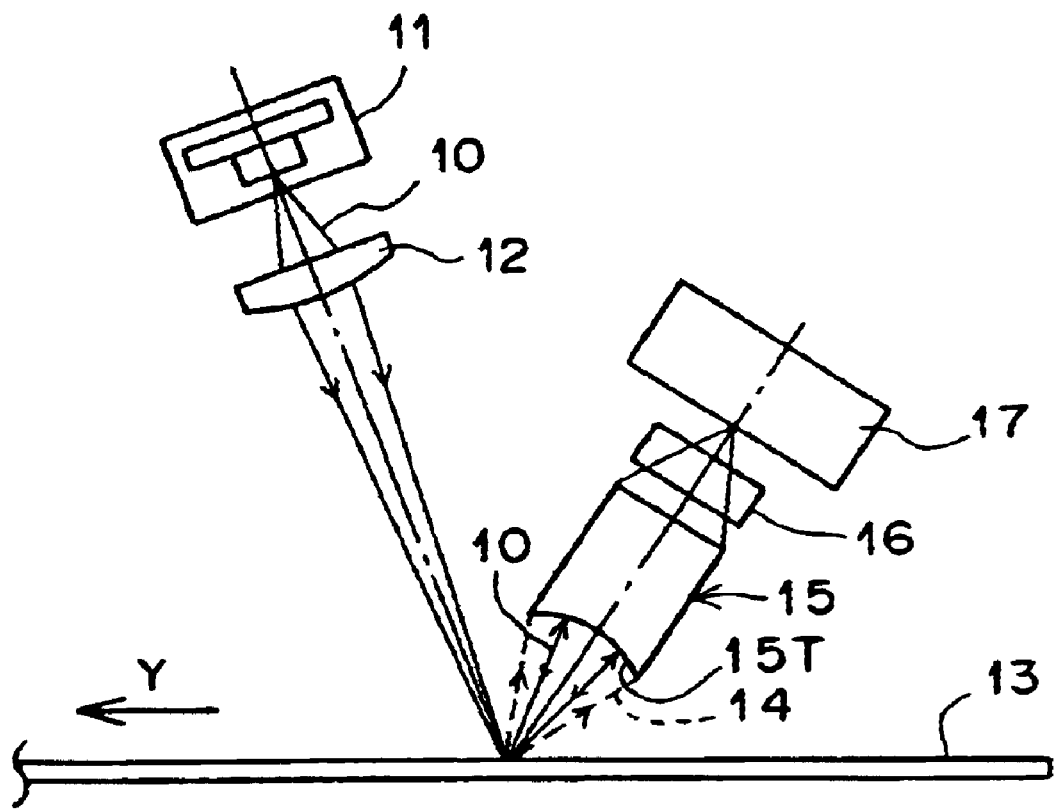
FIG. 2 is a side view showing a read-out optical system employed in the first embodiment of FIG. 1.
Figure 3:
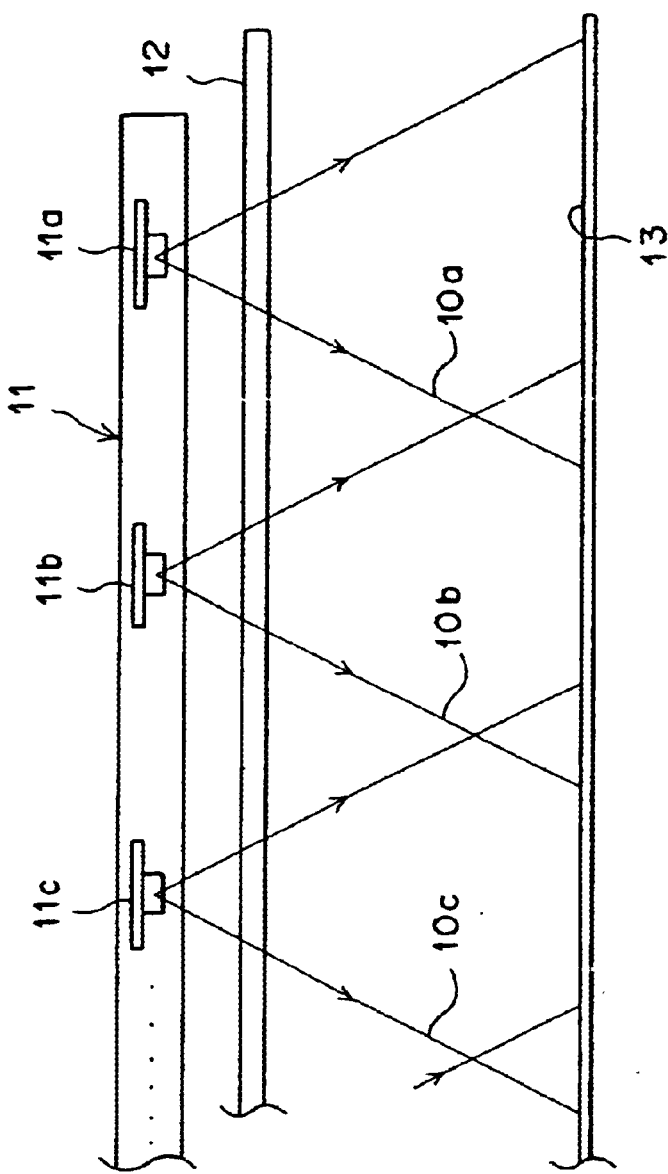
FIG. 3 is a front view showing the read-out optical system of FIG. 2.

FIG. 1 is a perspective view showing a first embodiment of the radiation image read-out apparatus in accordance with the present invention. FIG. 2 is a side view showing a read-out optical system employed in the first embodiment of FIG. 1. FIG. 3 is a front view showing the read-out optical system of FIG. 2.

As illustrated in FIG. 1, the radiation image read-out apparatus comprises a laser diode array 11 acting as the stimulating ray irradiating means for producing fan beam-like stimulating rays 10. The radiation image read-out apparatus also comprises a cylindrical lens 12 for converging the stimulating rays 10 only in the plane of the sheet of FIG. 2 in order to form linear stimulating rays 10. The radiation image read-out apparatus further comprises a lens array 15 for collecting light 14, which has been emitted from a linear area of a stimulable phosphor sheet 13 exposed to the linear stimulating rays 10. The radiation image read-out apparatus still further comprises a stimulating ray cut-off filter 16, which is located in an optical path of the emitted light 14 having passed through the lens array 15. The radiation image read-out apparatus also comprises a CCD line sensor 17 for detecting the emitted light 14, which has passed through the stimulating ray cut-off filter 16. The radiation image read-out apparatus further comprises an endless belt 18, which acts as sub-scanning means for moving the stimulable phosphor sheet 13 at a predetermined speed and in the sub-scanning direction indicated by the arrow Y. The sub-scanning direction is normal to the length direction of the linear area of the stimulable phosphor sheet 13 exposed to the linear stimulating rays 10 (i.e., the main scanning direction indicated by the double headed arrow X).

The radiation image read-out apparatus still further comprises an amplifier 20 for amplifying an analog light detection signal S, which has been fed out from the CCD line sensor 17. The radiation image read-out apparatus also comprises an analog-to-digital converter 21 for digitizing the analog light detection signal S, which has been amplified by the amplifier 20, into a digital image signal D. The digital image signal D, which has been obtained from the analog-to-digital converter 21, is fed into an image processing unit 22, which performs image processing on the digital image signal D. The digital image signal D, which has been obtained from the image processing performed by the image processing unit 22, is fed into an image reproducing apparatus 23.

As illustrated in FIG. 3, the laser diode array 11 comprises a plurality of laser diodes 11a, 11b, 11c, ... arrayed in a line. By way of example, each of the laser diodes 11a, 11b, 11c, ... produces a laser beam (the stimulating rays) having wavelengths falling within the range of 650 nm to 690 nm. The laser diodes 11a, 11b, 11c, ... respectively produce stimulating rays 10a, 10b, 10c, ... in a divergent light state. The stimulating rays 10a, 10b, 10c, ..., which have been produced by the laser diodes 11a, 11b, 11c, ..., are converged by the cylindrical lens 12 with respect to only one direction and into fan beams. The stimulating rays 10, which are composed of the fan beams standing in a row, are linearly irradiated onto the linear area of the stimulable phosphor sheet 13.

Figure 4:
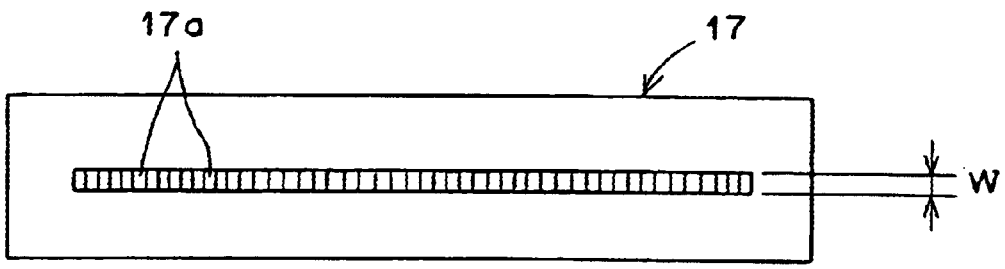
FIG. 4 is a plan view showing a line sensor employed in the first embodiment of FIG. 1.

FIG. 4 is a plan view showing the CCD line sensor 17 employed in the first embodiment of FIG. 1. As illustrated in FIG. 4, the CCD line sensor 17 comprises a plurality of sensor chips (photoelectric conversion devices) 17a, 17a, ..., which are arrayed in a line. In this embodiment, a light receiving width of the CCD line sensor 17, which light receiving width is taken in the direction normal to the array direction of the sensor chips 17a, 17a, ..., i.e. a width W of each of the sensor chips 17a, 17a, ..., is approximately equal to 100 μm.

The CCD line sensor 17 is located in an orientation such that the sensor chips 17a, 17a, ... stand side by side along the length direction of the linear area of the stimulable phosphor sheet 13 exposed to the linear stimulating rays 10, i.e. along the direction indicated by the double headed arrow X in FIG. 1. In cases where the stimulable phosphor sheet 13 has a large width, the CCD line sensor 17 may be composed of a plurality of line sensors, which are arrayed so as to stand in a row along the length direction of the CCD line sensor 17.

Figure 5:
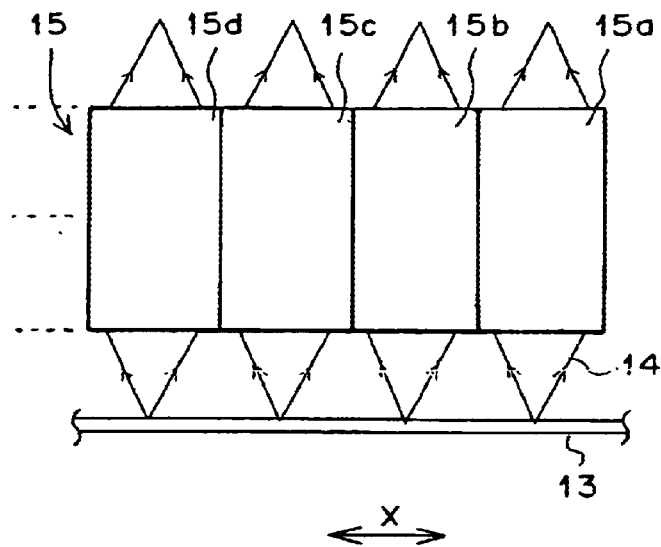
FIG. 5 is a front view showing a lens array employed in the first embodiment of FIG. 1.

FIG. 5 is a front view showing the lens array 15 employed in the first embodiment of FIG. 1. As illustrated in FIG. 5, the lens array 15 comprises, for example, a plurality of distributed index lenses 15a, 15b, 15c, 15d, ..., which are arrayed in a line. The lens array 15 is located in an orientation such that the distributed index lenses 15a, 15b, 15c, 15d, ... stand side by side along the length direction of the linear area of the stimulable phosphor sheet 13 exposed to the linear stimulating rays 10, i.e. along the direction indicated by the double headed arrow X in FIG. 1. Each of the distributed index lenses 15a, 15b, 15c, 15d, ... collects the emitted light 14 having been emitted by the stimulable phosphor sheet 13. Also, as illustrated in FIG. 1, each of the distributed index lenses 15a, 15b, 15c, 15d, ... guides the emitted light 14 toward the CCD line sensor 17.

How the first embodiment of the radiation image read-out apparatus in accordance with the present invention operates will be described hereinbelow.

The stimulable phosphor sheet 13 carries a radiation image of an object stored thereon by, for example, being exposed to radiation carrying radiation image information of the object. The stimulable phosphor sheet 13, on which the radiation image has been stored, is moved by the endless belt 18 at a predetermined speed and in the direction indicated by the arrow Y. Also, the stimulating rays 10 are produced by the laser diode array 11. The stimulating rays 10, which have been produced by the laser diode array 11, are linearly irradiated to an area of the stimulable phosphor sheet 13.

When the stimulating rays 10 are linearly irradiated to the area of the stimulable phosphor sheet 13, the linear area of the stimulable phosphor sheet 13 exposed to the linear stimulating rays 10 emits the light 14 having intensity in accordance with the radiation image having been stored on the stimulable phosphor sheet 13. The emitted light 14, which may be, for example, blue light, is collected by the lens array 15 and guided toward the CCD line sensor 17. The emitted light 14 is photoelectrically detected by the CCD line sensor 17. The stimulating rays 10, which are reflected from the stimulable phosphor sheet 13 and travel toward the CCD line sensor 17, are filtered out by the stimulating ray cut-off filter 16.

The CCD line sensor 17 photoelectrically detects the emitted light 14 and feeds out the analog light detection signal S, which corresponds to the intensity of the emitted light 14 (i.e., which represents the radiation image having been stored on the stimulable phosphor sheet 13). The analog light detection signal S is amplified by the amplifier 20 and converted by the analog-to-digital converter 21 into the digital image signal D.

Thereafter, the digital image signal D is fed into the image processing unit 22, which performs the image processing, such as gradation processing, on the digital image signal D. The digital image signal D, which has been obtained from the image processing performed by the image processing unit 22, is fed into the image reproducing apparatus 23 and is utilized for reproducing the radiation image, which has been stored on the stimulable phosphor sheet 13, as a visible image. The image reproducing apparatus 23 may be displaying means constituted of a CRT display device, or the like. Alternatively, the image reproducing apparatus 23 may be a recording apparatus for performing light scanning recording on photosensitive film.

As illustrated in detail in FIG. 2, a bottom end face 15T of the lens array 15, i.e. the end face which stands facing the stimulable phosphor sheet 13, is formed into a shape constituting part of a cylindrical surface, which part extends along the linear area of the stimulable phosphor sheet 13 exposed to the linear stimulating rays. Also, the lens array 15 is located in an orientation such that the stimulating rays 10, which have been reflected through regular reflection or diffused reflection from the surface of the stimulable phosphor sheet 13, are reflected by the bottom end face 15T of the lens array 15 and again impinge upon the linear area of the stimulable phosphor sheet 13 exposed to the linear stimulating rays.

Therefore, with this embodiment, the stimulating rays 10, which have been reflected from the surface of the stimulable phosphor sheet 13, do not impinge upon an unread fresh region of the stimulable phosphor sheet 13, from which unread fresh region the radiation image information has not yet been read out, (i.e., in FIG. 2, the region located more rightward than the linear area of the stimulable phosphor sheet 13 exposed to the linear stimulating rays). Accordingly, the problems are capable of being prevented from occurring in that the unread fresh region of the stimulable phosphor sheet 13 is stimulated by the reflected stimulating rays 10 to emit light, and the thus emitted light is detected by the CCD line sensor 17. As a result, the image quality of the reproduced radiation image is capable of being prevented from becoming bad. Also, an artifact is capable of being prevented from occurring in the reproduced radiation image.

Further, in cases where the stimulating rays 10, which have been reflected through the regular reflection or the diffused reflection from the surface of the stimulable phosphor sheet 13, are caused to again impinge upon the linear area of the stimulable phosphor sheet 13 exposed to the linear stimulating rays, the reflected stimulating rays 10 are capable of being efficiently utilized for stimulating the stimulable phosphor sheet 13. Therefore, the efficiency, with which the stimulating rays 10 are utilized, is capable of being kept high.

Figure 6:
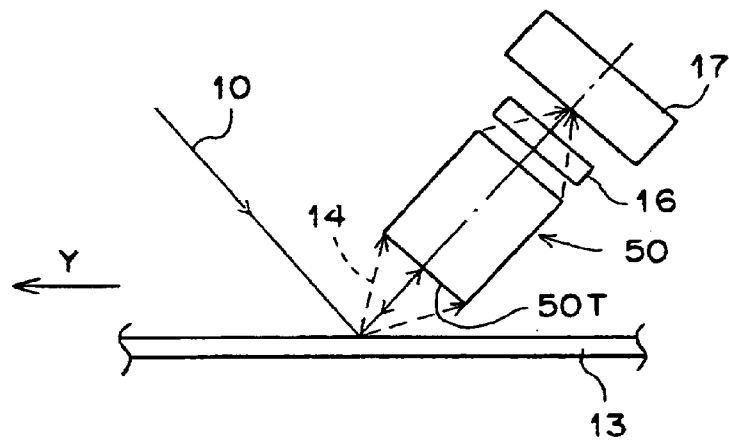
FIG. 6 is a side view showing a read-out optical system employed in a second embodiment of the radiation image read-out apparatus in accordance with the present invention.

A second embodiment of the radiation image read-out apparatus in accordance with the present invention will be described hereinbelow with reference to FIG. 6. FIG. 6 is a side view showing a read-out optical system employed in the second embodiment of the radiation image read-out apparatus in accordance with the present invention. In FIG. 6, similar elements are numbered with the same reference numerals with respect to FIG. 2.

In the second embodiment of FIG. 6, a bottom end face 50T of a lens array 50, i.e. the end face which stands facing the stimulable phosphor sheet 13, is formed into a flat shape. Also, the lens array 50 is located in an orientation such that the stimulating rays 10, which have been reflected through regular reflection from the surface of the stimulable phosphor sheet 13, are reflected by the bottom end face 50T of the lens array 50 and again impinge upon the linear area of the stimulable phosphor sheet 13 exposed to the linear stimulating rays.

Therefore, with the second embodiment, the stimulating rays 10, which have been reflected from the surface of the stimulable phosphor sheet 13, do not impinge upon the unread fresh region of the stimulable phosphor sheet 13, from which unread fresh region the radiation image information has not yet been read out, (i.e., in FIG. 6, the region located more rightward than the linear area of the stimulable phosphor sheet 13 exposed to the linear stimulating rays). Accordingly, the problems are capable of being prevented from occurring in that the unread fresh region of the stimulable phosphor sheet 13 is stimulated by the reflected stimulating rays 10 to emit light, and the thus emitted light is detected by the CCD line sensor 17. As a result, the image quality of the reproduced radiation image is capable of being prevented from becoming bad. Also, an artifact is capable of being prevented from occurring in the reproduced radiation image.

Further, in cases where the stimulating rays 10, which have been reflected through the regular reflection from the surface of the stimulable phosphor sheet 13, are caused to again impinge upon the linear area of the stimulable phosphor sheet 13 exposed to the linear stimulating rays, the reflected stimulating rays 10 are capable of being efficiently utilized for stimulating the stimulable phosphor sheet 13. Therefore, the efficiency, with which the stimulating rays 10 are utilized, is capable of being kept high.

Figure 7:
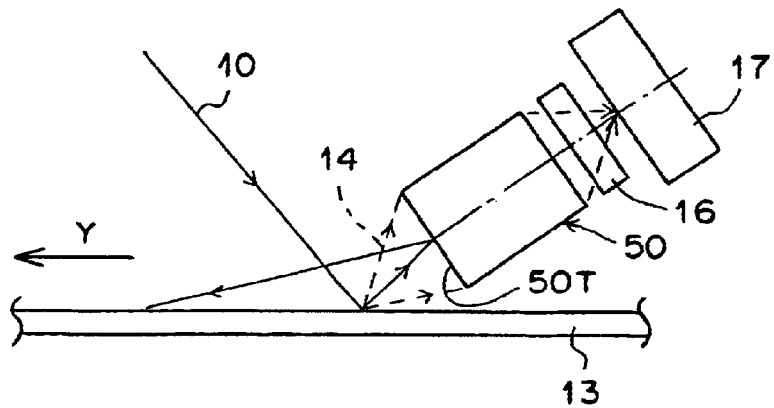
FIG. 7 is a side view showing a read-out optical system employed in a third embodiment of the radiation image read-out apparatus in accordance with the present invention.

A third embodiment of the radiation image read-out apparatus in accordance with the present invention will be described hereinbelow with reference to FIG. 7. FIG. 7 is a side view showing a read-out optical system employed in the third embodiment of the radiation image read-out apparatus in accordance with the present invention. In FIG. 7, similar elements are numbered with the same reference numerals with respect to FIG. 2.

In the third embodiment of FIG. 7, the bottom end face 50T of the lens array 50, i.e. the end face which stands facing the stimulable phosphor sheet 13, is formed into a flat shape. Also, the lens array 50 is located in an orientation such that the stimulating rays 10, which have been reflected through regular reflection from the surface of the stimulable phosphor sheet 13, are reflected by the bottom end face 50T of the lens array 50 and impinge upon a region of the stimulable phosphor sheet 13, which region is located more forward, with respect to the sub-scanning direction indicated by the arrow Y, than the linear area of the stimulable phosphor sheet 13 exposed to the linear stimulating rays, (i.e., in FIG. 7, the region of the stimulable phosphor sheet 13, which region is located more leftward than the linear area of the stimulable phosphor sheet 13 exposed to the linear stimulating rays, and from which region the radiation image information has already been read out).

Therefore, with the third embodiment, the stimulating rays 10, which have been reflected from the surface of the stimulable phosphor sheet 13, do not impinge upon the unread fresh region of the stimulable phosphor sheet 13, from which unread fresh region the radiation image information has not yet been read out, (i.e., in FIG. 7, the region located more rightward than the linear area of the stimulable phosphor sheet 13 exposed to the linear stimulating rays). Accordingly, the problems are capable of being prevented from occurring in that the unread fresh region of the stimulable phosphor sheet 13 is stimulated by the reflected stimulating rays 10 to emit light, and the thus emitted light is detected by the CCD line sensor 17. As a result, the image quality of the reproduced radiation image is capable of being prevented from becoming bad. Also, an artifact is capable of being prevented from occurring in the reproduced radiation image.

In cases where the bottom end face 15T of the lens array 15 is formed into a shape constituting part of the cylindrical surface as illustrated in FIG. 2, the orientation of the lens array 15 may be set such that the stimulating rays 10, which have been reflected by the bottom end face 15T of the lens array 15, impinge upon the region of the stimulable phosphor sheet 13, which region is located more forward, with respect to the sub-scanning direction indicated by the arrow Y, than the linear area of the stimulable phosphor sheet 13 exposed to the linear stimulating rays.

In the radiation image read-out apparatus in accordance with the present invention, the optical device for reflecting the stimulating rays 10, which have been reflected from the surface of the stimulable phosphor sheet 13, is not limited to the lens array 15 or the lens array 50 described above. For example, in the constitutions illustrated in FIG. 2, FIG. 6, and FIG. 7, in cases where the stimulating ray cut-off filter 16 is located on the side closer to the stimulable phosphor sheet 13 than the lens array 15 or the lens array 50 is, an end face of the stimulating ray cut-off filter 16, which end face stands facing the stimulable phosphor sheet 13, may be formed into the shape such that the stimulating rays 10, which have been reflected from the surface of the stimulable phosphor sheet 13, are reflected by the end face toward the linear area of the stimulable phosphor sheet 13 exposed to the linear stimulating rays or toward the region of the stimulable phosphor sheet 13, which region is located more forward, with respect to the sub-scanning direction indicated by the arrow Y, than the linear area of the stimulable phosphor sheet 13 exposed to the linear stimulating rays.

In the first, second, and third embodiments of the radiation image read-out apparatus in accordance with the present invention, the stimulable phosphor sheet for storing the radiation image may be an ordinary stimulable phosphor sheet having both the functions for absorbing radiation and the functions for storing energy from the radiation. Alternatively, the stimulable phosphor sheet may be a stimulable phosphor sheet proposed in, for example, Japanese Patent Application No. 11(1999)-372978. With the proposed stimulable phosphor sheet, such that the functions for absorbing radiation and the functions for storing energy from the radiation may be separated from each other, the stimulable phosphor sheet is provided with a layer of a stimulable phosphor for energy storage. In cases where the stimulable phosphor sheet provided with the layer of the stimulable phosphor for energy storage is utilized, the detection quantum efficiency in the formation of the radiation image, i.e., the radiation absorptivity, the light emission efficiency, the emitted light pickup efficiency, and the like, is capable of being enhanced as a whole. Therefore, the image quality of the reproduced image is capable of being enhanced even further.

Further, the stimulable phosphor sheet employed in the first, second, and third embodiments of the radiation image read-out apparatus in accordance with the present invention may be a stimulable phosphor sheet for energy subtraction processing, which stores two radiation images of a single object formed with radiation having different energy distributions, the stimulable phosphor sheet being capable of emitting light, which carries information of one of the two radiation images, from one surface, and emitting light, which carries information of the other radiation image, from the other surface.

In such cases, the radiation image read-out apparatus in accordance with the present invention may comprise two line sensors, each of which is located on one of the opposite surface sides of the stimulable phosphor sheet, the two line sensors detecting two image signals, each of which is made up of a series of image signal components representing pixels in the radiation image, from the opposite surfaces of the stimulable phosphor sheet. Further, in such cases, the radiation image read-out apparatus in accordance with the present invention may be provided with reading means for performing a subtraction process on image signal components of the two image signals, which image signal components represent corresponding pixels on the opposite surfaces of the stimulable phosphor sheet.

As the stimulable phosphor sheet for energy subtraction processing, it is possible to employ an anisotropic stimulable phosphor sheet, such as a stimulable phosphor sheet, wherein the light emission region of the stimulable phosphor sheet is partitioned by a stimulating ray reflecting partition member, which extends in the thickness direction of the stimulable phosphor sheet, into a plurality of fine cells.

What is claimed is:

1. A radiation image read-out method, comprising the steps of i) linearly irradiating stimulating rays onto an area of a surface of a stimulable phosphor sheet, on which a radiation image has been stored, with stimulating ray irradiating means, the stimulating rays causing the stimulable phosphor sheet to emit light in proportion to an amount of energy stored thereon during its exposure to radiation, ii) collecting the light, which has been emitted from the linear area of the stimulable phosphor sheet exposed to the linear stimulating rays, with a light collecting optical system, iii) receiving the collected light with a line sensor, which comprises a plurality of photoelectric conversion devices arrayed along the linear area of the stimulable phosphor sheet exposed to the linear stimulating rays, the received light being subjected to photoelectric conversion performed by the line sensor, and iv) moving the stimulable phosphor sheet with respect to the stimulating ray irradiating means, the light collecting optical system, and the line sensor and in a sub-scanning direction, which intersects with a length direction of the linear area of the stimulable phosphor sheet exposed to the linear stimulating rays, wherein an end face of an optical device constituting the light collecting optical system, which end face stands facing the stimulable phosphor sheet, is formed into a shape such that the stimulating rays, which have been reflected from the surface of the stimulable phosphor sheet, are reflected by the end face toward the linear area of the stimulable phosphor sheet exposed to the linear stimulating rays or toward a region of the stimulable phosphor sheet, which region is located more forward, with respect to the sub-scanning direction, than the linear area of the stimulable phosphor sheet exposed to the linear stimulating rays.

2. A method as defined in claim 1 wherein the optical device is a gradient index lens array.

3. A method as defined in claim 1 or 2 wherein the end face of the optical device, which end face stands facing the stimulable phosphor sheet, is formed into a shape such that the stimulating rays, which have been regularly reflected from the surface of the stimulable phosphor sheet, are reflected by the end face toward the linear area of the stimulable phosphor sheet exposed to the linear stimulating rays or toward the region of the stimulable phosphor sheet, which region is located more forward, with respect to the sub-scanning direction, than the linear area of the stimulable phosphor sheet exposed to the linear stimulating rays.

4. A method as defined in claim 1 or 2 wherein the stimulable phosphor sheet contains a stimulable phosphor, which is capable of absorbing light having wavelengths falling within an ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

5. A method as defined in claim 4 wherein the stimulable phosphor sheet is provided with a layer of a phosphor for radiation absorption, which is capable of absorbing radiation and being caused to emit light having wavelengths falling within an ultraviolet to visible region.

6. The method of claim 1 wherein the stimulating ray irradiating means comprises of a plurality of laser diodes.

7. The method of claim 1 wherein the stimulating ray irradiating means, the light collecting optical system, and the line sensor are moved while the stimulable phosphor sheet is kept stationary.

8. The method of claim 1 wherein both the stimulable phosphor sheet and the stimulating ray irradiating means, the light collecting optical system, and the line sensor are moved.

9. A radiation image read-out apparatus, comprising:

i) stimulating ray irradiating means for linearly irradiating stimulating rays onto an area of a surface of a stimulable phosphor sheet, on which a radiation image has been stored, the stimulating rays causing the stimulable phosphor sheet to emit light in proportion to an amount of energy stored thereon during its exposure to radiation, ii) a line sensor, which comprises a plurality of photoelectric conversion devices arrayed along the linear area of the stimulable phosphor sheet exposed to the linear stimulating rays, iii) a light collecting optical system, which is located between the line sensor and the stimulable phosphor sheet, the light collecting optical system collecting the light, which has been emitted from the linear area of the stimulable phosphor sheet exposed to the linear stimulating rays, and guiding the collected light toward the line sensor, and iv) sub-scanning means for moving the stimulable phosphor sheet with respect to the stimulating ray irradiating means, the light collecting optical system, and the line sensor and in a sub-scanning direction, which intersects with a length direction of the linear area of the stimulable phosphor sheet exposed to the linear stimulating rays, wherein an end face of an optical device constituting the light collecting optical system, which end face stands facing the stimulable phosphor sheet, is formed into a shape such that the stimulating rays, which have been reflected from the surface of the stimulable phosphor sheet, are reflected by the end face toward the linear area of the stimulable phosphor sheet exposed to the linear stimulating rays or toward a region of the stimulable phosphor sheet, which region is located more forward, with respect to the sub-scanning direction, than the linear area of the stimulable phosphor sheet exposed to the linear stimulating rays.

10. An apparatus as defined in claim 9 wherein the optical device is a gradient index lens array.

11. An apparatus as defined in claim 9 or 10 wherein the end face of the optical device, which end face stands facing the stimulable phosphor sheet, is formed into a shape such that the stimulating rays, which have been regularly reflected from the surface of the stimulable phosphor sheet, are reflected by the end face toward the linear area of the stimulable phosphor sheet exposed to the linear stimulating rays or toward the region of the stimulable phosphor sheet, which region is located more forward, with respect to the sub-scanning direction, than the linear area of the stimulable phosphor sheet exposed to the linear stimulating rays.

12. An apparatus as defined in claim 9 or 10 wherein the stimulable phosphor sheet contains a stimulable phosphor, which is capable of absorbing light having wavelengths falling within an ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

13. An apparatus as defined in claim 12 wherein the stimulable phosphor sheet is provided with a layer of a phosphor for radiation absorption, which is capable of absorbing radiation and being caused to emit light having wavelengths falling within an ultraviolet to visible region.

14. A radiation image read-out method, comprising the steps of:

linearly irradiating stimulating rays onto an area of a surface of a stimulable phosphor sheet, on which a radiation image has been stored, with stimulating ray irradiating means, the stimulating rays causing the stimulable phosphor sheet to emit light in proportion to an amount of energy stored thereon during its exposure to radiation, collecting the light, which has been emitted from the linear area of the stimulable phosphor sheet exposed to the linear stimulating rays, with a light collecting optical system, receiving the collected light with a line sensor, which comprises a plurality of photoelectric conversion devices arrayed along the linear area of the stimulable phosphor sheet exposed to the linear stimulating rays, the received light being subjected to photoelectric conversion performed by the line sensor, and moving the stimulable phosphor sheet with respect to the stimulating ray irradiating means, the light collecting optical system, and the line sensor and in a sub-scanning direction, which intersects with a length direction of the linear area of the stimulable phosphor sheet exposed to the linear stimulating rays, wherein an end face of an optical device constituting the light collecting optical system, which end face stands facing the stimulable phosphor sheet, is formed into a shape such that the stimulating rays, which have been reflected from the surface of the stimulable phosphor sheet, are reflected by the end face toward the linear area of the stimulable phosphor sheet exposed to the linear stimulating rays.

15. The method of claim 14 wherein the linear area comprises an area from which light is contemporaneously being collected.

* * * * *